(12) United States Patent
Dong et al.

(10) Patent No.: US 11,682,788 B2
(45) Date of Patent: Jun. 20, 2023

(54) SECONDARY BATTERY AND APPARATUS CONTAINING SUCH SECONDARY BATTERY

(71) Applicant: Contemporary Amperex Technology Co., Limited, Ningde (CN)

(72) Inventors: Xiaobin Dong, Ningde (CN); Jiazheng Wang, Ningde (CN); Meng Kang, Ningde (CN); Libing He, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/810,646

(22) Filed: Jul. 5, 2022

(65) Prior Publication Data

US 2022/0336845 A1    Oct. 20, 2022

Related U.S. Application Data

(63) Continuation of application No. PCT/CN2020/097593, filed on Jun. 23, 2020.

(51) Int. Cl.
| | |
|---|---|
| *H01M 10/0525* | (2010.01) |
| *H01M 4/04* | (2006.01) |
| *H01M 4/587* | (2010.01) |
| *H01M 4/66* | (2006.01) |
| *H01M 4/02* | (2006.01) |

(52) U.S. Cl.
CPC ..... *H01M 10/0525* (2013.01); *H01M 4/0404* (2013.01); *H01M 4/587* (2013.01); *H01M 4/661* (2013.01); *H01M 2004/021* (2013.01); *H01M 2004/027* (2013.01)

(58) Field of Classification Search
CPC ....................... H01M 10/0525; H10M 4/0404
See application file for complete search history.

(56) References Cited

U.S. PATENT DOCUMENTS 6,884,547 B2 *  4/2005  Mori ................... H01M 10/052
                                                      429/231.95

FOREIGN PATENT DOCUMENTS

| CN | 102637859 A | 8/2012 |
|---|---|---|
| CN | 108807959 A | 11/2018 |

(Continued)

OTHER PUBLICATIONS

The first Office Action received in the corresponding Korean Application 10-2022-7023441, dated Nov. 29, 2022.

(Continued)

*Primary Examiner* — Ula C Ruddock
*Assistant Examiner* — Thomas H. Parsons
(74) *Attorney, Agent, or Firm* — Kilpatrick Townsend & Stockton LLP

(57) ABSTRACT

Embodiments provide a secondary battery and an apparatus containing the secondary battery. The secondary battery includes a negative electrode plate. The negative electrode plate includes a copper-based current collector and a negative electrode film layer disposed on at least one surface of the copper-based current collector and including a negative electrode active material, and the negative electrode active material includes graphite. The negative electrode plate satisfies $T_x \geq 25$, where $T_x$ is as defined in the specification.

10 Claims, 4 Drawing Sheets

(56) References Cited

FOREIGN PATENT DOCUMENTS

| | | | |
|---|---|---|---|
| CN | 110943228 | A | 3/2020 |
| JP | 2008210564 | A | 9/2008 |
| JP | 2012243454 | A | 12/2012 |
| JP | 5257740 | B2 | 8/2013 |
| JP | 5321788 | * | 10/2013 |
| JP | 5321788 | B2 * | 10/2013 |
| JP | 2016122634 | A | 7/2016 |
| JP | 2017063040 | A | 3/2017 |
| JP | 2018156931 | A | 10/2018 |
| WO | WO2007143388 | * | 12/2007 |
| WO | 2014050097 | A1 | 4/2014 |
| WO | 2020073803 | A1 | 4/2020 |

OTHER PUBLICATIONS

International Search Report received in PCT Application PCT/CN2020/097593 dated Mar. 11, 2021.
GB/T 5162-2006 standard, "Metallic powders—Determination of tap density".
GB/T 19077-2016 standard, "Particle size analysis-Laser diffraction methods".
JIS K 0131-1996 standard, "General rules for X-ray diffractometric analysis".
The first Office Action received in the corresponding Japanese Application 2022-542226, dated Jan. 5, 2023.
Notice of Allowance received in the corresponding Korean Application 10-2022-7023441, dated Mar. 14, 2023, 5 pages.

* cited by examiner

SECONDARY BATTERY AND APPARATUS CONTAINING SUCH SECONDARY BATTERY

CROSS-REFERENCE TO RELATED APPLICATIONS

This application is a continuation of International Application PCT/CN2020/097593, filed on Jun. 23, 2020 and entitled "SECONDARY BATTERY AND APPARATUS CONTAINING SUCH SECONDARY BATTERY", which is incorporated herein by reference in its entirety.

TECHNICAL FIELD

This application relates to the technical field of secondary batteries, and specifically, to a secondary battery and an apparatus containing such secondary battery.

BACKGROUND

Secondary batteries represented by lithium-ion batteries are widely used because of their advantages such as high specific energy, long service life, low cost, safety and stability. For example, increasingly prominent environmental and energy issues urgently require development of new energy electric vehicles, which will promote a fast growing demand for the secondary batteries.

However, the secondary batteries have a relatively low fast charging capability, causing users to worry about endurance mileage of electric vehicles. Therefore, the fast charging capability of the secondary batteries need to be improved to increase market recognition and market competitiveness of the new energy electric vehicles.

SUMMARY

A first aspect of this application provides a secondary battery, including a negative electrode plate, where the negative electrode plate includes a copper-based current collector and a negative electrode film layer disposed on at least one surface of the copper-based current collector and including a negative electrode active material, and the negative electrode active material includes graphite, where the negative electrode plate satisfies $T_x \geq 25$, and $$T_x = \sqrt[4]{I_{Cu}^2/(I_{004} \times I_{110})}, \text{ where}$$

$I_{Cu}$ represents diffraction peak intensity of a (111) crystal plane of the copper-based current collector of the negative electrode plate in an X-ray diffraction pattern;

$I_{110}$ represents diffraction peak intensity of a (110) crystal plane of the graphite of the negative electrode plate in the X-ray diffraction pattern; and $I_{004}$ represents diffraction peak intensity of a (004) crystal plane of the graphite of the negative electrode plate in the X-ray diffraction pattern.

A second aspect of this application provides an apparatus, including the secondary battery in the first aspect of this application.

It is surprisingly found that in the secondary battery in accordance with the present disclosure, the negative electrode active material includes graphite, and the negative electrode plate satisfies a specific relationship $T_x$ between the diffraction peak intensity of the (111) crystal plane of Cu, the diffraction peak intensity of the (004) crystal plane of the graphite, and the diffraction peak intensity of the (110) crystal plane of the graphite, so that the secondary battery can have both good fast charging capability and high cycling performance. More preferably, the secondary battery may also have high energy density. The apparatus of this application includes the secondary battery provided in this application, and therefore has at least the same advantages as the secondary battery.

In some embodiments, the negative electrode plate satisfies $29 \leq T_x \leq 70$.

In some embodiments, the negative electrode plate satisfies $35 \leq T_x \leq 60$.

In some embodiments, the negative electrode plate satisfies $40 \leq T_x \leq 50$.

$T_x$ is in an appropriate range, so that the negative electrode plate has relatively high lithiation performance and reversible capacity, allowing the secondary battery to have good fast charging capability, high cycling performance, and high energy density at the same time.

In some embodiments, a thickness of the copper-based current collector is less than or equal to 8 µm; and optionally, the thickness of the copper-based current collector is 4 µm to 6.5 µm. In a case that the thickness of the copper-based current collector is in a given range, the fast charging capability and cycling performance of the battery can be further improved.

In some embodiments, a mass percentage of Cu in the copper-based current collector is greater than or equal to 99%; and optionally, the mass percentage of Cu in the copper-based current collector is 99.5% to 100%. In a case that the mass percentage of Cu in the copper-based current collector is in a given range, the cycling performance of the battery can be further improved.

In some embodiments, a tap density of the negative electrode active material is 0.9 g/cm³ to 1.15 g/cm³; and optionally, the tap density of the negative electrode active material is 0.9 g/cm³ to 1.05 g/cm³. In a case that the tap density of the negative electrode active material is in a given range, the energy density and fast charging capability of the battery can be further improved.

In some embodiments, a volume-based median particle size $D_v50$ of the negative electrode active material is 6 µm to 14 µm; and optionally, the volume-based median particle size $D_v50$ of the negative electrode active material is 8 µm to 12 µm. In a case that the volume-based median particle size $D_v50$ of the negative electrode active material is in a given range, the fast charging capability and cycling performance of the battery can be further improved.

In some embodiments, a gram capacity of the negative electrode active material is 345 mAh/g to 360 mAh/g; and optionally, the gram capacity of the negative electrode active material is 348 mAh/g to 355 mAh/g. In a case that the gram capacity of the negative electrode active material is in a given range, provided that the battery has a relatively high energy density, the fast charging capability and cycling performance of the battery can be further improved.

In some embodiments, the negative electrode active material includes artificial graphite; optionally, a mass percentage of the artificial graphite in the negative electrode active material is greater than or equal to 60%; and optionally, the mass percentage of the artificial graphite in the negative electrode active material is 80% to 100%. In a case that the negative electrode active material includes the artificial graphite, the fast charging capability and cycling performance of the battery can be further improved.

In some embodiments, a compacted density of the negative electrode film layer is 1.4 g/cm³ to 1.65 g/cm³; and optionally, the compacted density of the negative electrode film layer is 1.45 g/cm³ to 1.55 g/cm³. In a case that the compacted density of the negative electrode film layer is in a given range, the energy density and fast charging capability of the battery can be further improved.

In some embodiments, a surface density of the negative electrode film layer is less than or equal to 12.5 mg/cm$^2$; and optionally, the surface density of the negative electrode film layer is 9.0 mg/cm$^2$ to 10.5 mg/cm$^2$. In a case that the surface density of the negative electrode film layer is in a given range, the energy density and fast charging capability of the battery can be further improved.

BRIEF DESCRIPTION OF DRAWINGS

To describe the technical solutions in various embodiments more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

DETAILED DESCRIPTION OF EMBODIMENTS

Figure 1:
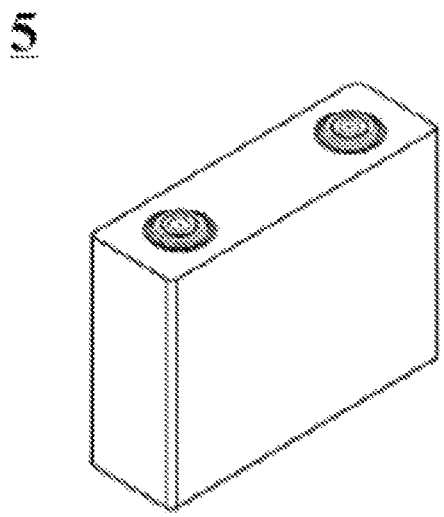
FIG. 1 is a schematic diagram of an embodiment of a secondary battery.

To make the objectives, technical solutions, and beneficial technical effects of this application clearer, the following further describes this application in detail with reference to the embodiments. It should be understood that the embodiments described in this specification are merely intended to interpret this application, but not intended to limit this application.

For simplicity, only some numerical ranges are explicitly. However, any lower limit may be combined with any upper limit to form a range not explicitly recorded, and any lower limit may be combined with another lower limit to form a range not explicitly recorded, and likewise, any upper limit may be combined with any other upper limit to form a range not explicitly recorded. In addition, although not explicitly recorded, each point or individual value between end points of a range is included in the range. Therefore, each point or individual value may itself be a lower limit or upper limit to be combined with any other point or individual value or combined with any other lower limit or upper limit to form a range not expressly recorded.

As used herein, it should be noted that, unless otherwise stated, "more than" and "less than" is inclusive of the present number and "more" in "one or more" means two or more than two.

The present disclosure is not intended to describe each of the disclosed embodiments or implementations of this application. The following description illustrates exemplary embodiments in detail by using examples. In the present disclosure, guidance is provided by using a series of embodiments and the embodiments may be used in various combinations. In the examples, enumeration is merely representative but should not be interpreted as exhaustive.

Secondary Battery

One embodiment provides a secondary battery. The secondary battery includes a positive electrode plate, a negative electrode plate, and an electrolyte. During charging and discharging of the battery, active ions are intercalated and deintercalated back and forth between the positive electrode plate and the negative electrode plate. The electrolyte conducts ions between the positive electrode plate and the negative electrode plate.

[Negative Electrode Plate]

In the secondary battery in accordance with the present disclosure, the negative electrode plate includes a copper-based current collector and a negative electrode film layer disposed on at least one surface of the copper-based current collector and including a negative electrode active material, and the negative electrode active material includes graphite. The negative electrode plate satisfies $T_x \geq 25$, and $$T_x = \sqrt{I_{Cu}^2/(I_{004} \times I_{110})}, \text{ where}$$

$I_{Cu}$ represents diffraction peak intensity of a (111) crystal plane of the copper-based current collector of the negative electrode plate in an X-ray diffraction pattern; $I_{110}$ represents diffraction peak intensity of a (110) crystal plane of the graphite of the negative electrode plate in the X-ray diffraction pattern; and $I_{004}$ represents diffraction peak intensity of a (004) crystal plane of the graphite of the negative electrode plate in the X-ray diffraction pattern.

During charging of the secondary battery, the active ions intercalate from the positive electrode plate and reach the negative electrode plate, and the negative electrode active material obtains negative charges (free electrons) from the current collector to drive the active ions to intercalate into the negative electrode active material. Therefore, in the negative electrode plate, electronic conductivity of the current collector, distribution capability of negative charges in the negative electrode film layer, and active ion transmission capability in the negative electrode film layer all affect lithiation performance, and the lithiation performance in the negative electrode plate directly affects a fast charging capability of the battery. The inventor has found through a lot of research that in a case that the negative electrode active material includes graphite, and the negative electrode plate satisfies a specific relationship between the diffraction peak intensity of the (111) crystal plane of Cu, diffraction peak intensity of the (004) crystal plane of the graphite, and diffraction peak intensity of the (110) crystal plane of the graphite in an X-ray diffraction pattern of the negative electrode plate, an unobstructed pore structure is formed between particles of the negative electrode active material of the negative electrode plate in a thickness direction of the electrode plate, and an inner layer of the negative electrode film layer can also obtain good liquid electrolyte infiltration, so that during charging, the active ions from the positive electrode can be more quickly conducted to an area of the negative electrode film layer closer to the current collector. In addition, the copper-based current collector has good electronic conductivity, and a voltage drop is relatively small when negative charges are conducted through the current collector to an area of the negative electrode film layer farther away from the current collector, so that in different areas of the negative electrode film layer, potentials are distributed consistently and charges are distributed uniformly, allowing negative electrode active materials in different areas to intercalate lithium uniformly. Therefore, the entire negative electrode film layer in the negative electrode plate can obtain relatively high lithiation performance, thereby improving the fast charging capability of the battery.

In addition, the negative electrode film layer has good conductivity of active ions, and has consistent potential distribution and uniform charge distribution in different areas of the negative electrode film layer, which can make full use of capacity performance of the entire negative electrode active material in the film layer and improve an energy density of the battery. Further, the problem of an excessively high lithiation state on a surface and/or part of the film layer caused by concentration of the active ions on the surface and/or part of the film layer can be greatly alleviated. This can reduce the risk of reducing and precipitating the active ions (such as lithium precipitation) on the surface and/or part of the film layer, and can also reduce irreversible capacity loss of the battery and polarization, so that the battery can also have relatively high cycling performance. During charging at a high rate current, metal dendrites are not easily formed, so that the secondary battery can also have relatively high safety performance.

In some embodiments, the negative electrode plate satisfies $29 \leq T_x \leq 70$. $T_x$ is in an appropriate range, so that the negative electrode plate has relatively high lithiation performance and reversible capacity, allowing the secondary battery to have good fast charging capability, high cycling performance, and high energy density at the same time.

In some embodiments, the negative electrode plate satisfies $35 \leq T_x \leq 60$. In a case that the negative electrode active material includes the graphite, and $T_x$ of the negative electrode plate is in a given range, the secondary battery can be charged from 10% SOC (State of Charge, state of charge) to 80% SOC within 20 minutes. The secondary battery has a good fast charging capability. For example, $T_x$ of the negative electrode plate may be $35 \leq T_x \leq 59$, $37 \leq T_x \leq 58$, $39 \leq T_x \leq 57$, $40 \leq T_x \leq 60$, $42 \leq T_x \leq 56$, $45 \leq T_x \leq 53$, and the like.

In some embodiments, the negative electrode plate satisfies $40 \leq T_x \leq 50$. In a case that the negative electrode active material includes the graphite, and $T_x$ of the negative electrode plate is in a given range, the secondary battery can be charged from 10% SOC to 80% SOC within 10 minutes. The fast charging capability of the secondary battery is further improved, and relatively high energy density is also ensured for the battery. For example, $T_x$ of the negative electrode plate is $41 \leq T_x \leq 50$, $42 \leq T_x \leq 50$, $43 \leq T_x \leq 50$, $45 \leq T_x \leq 50$, $44 \leq T_x \leq 48$, and the like.

In the negative electrode plate in accordance with the present disclosure, the copper-based current collector may include one or more of copper and copper alloy. The copper alloy may be selected from copper-nickel alloy, copper-indium alloy, copper-silver alloy, and the like. A mass percentage of Cu in the copper alloy is preferably more than 98%, for example, 99%-100%. In some embodiments, the copper-based current collector may be selected from one or more of copper foil and copper alloy foil.

In some embodiments, a mass percentage of Cu in the copper-based current collector is greater than or equal to 99%, for example, may be 99.5%-100%. Because of a relatively high percentage of Cu in the copper-based current collector, the electronic conductivity of the copper-based current collector can be improved. In addition, the negative charges of the current collector can be uniformly distributed in different areas of the negative electrode film layer during charging, which improves fast lithiation performance of different areas of the film layer, thereby improving the fast charging capability and cycling performance of the battery. In addition, because of relatively high purity of the copper-based current collector, adverse effects on an electrochemical reaction system caused by side reaction of heteroatoms in the copper-based current collector can be reduced, thereby further improving the cycling performance of the battery.

In some embodiments, a thickness of the copper-based current collector is less than or equal to 8 µm; and optionally, the thickness of the copper-based current collector may be 4 µm to 6.5 µm, 4.5 µm to 6 µm, and the like. In a case that the thickness of the copper-based current collector is in an appropriate range, the copper-based current collector can have good electronic conductivity, the voltage drop can be reduced when the negative charge reaches the area of the negative electrode film layer farther away from the current collector through the current collector, and potential distribution consistency and charge distribution uniformity in different areas of the negative electrode film layer can be improved, thereby further improving the fast charging capability of the battery. In addition, the risk of reducing and precipitating the active ions (such as lithium precipitation) on the surface and/or part of the negative electrode film layer can be reduced, thereby further improving the cycling performance of the battery. In a case that the thickness of the copper-based current collector is appropriate, the copper-based current collector is relatively tough and is not easy to break or generate defects during pressing (for example, subject to cold pressing and a cycle swelling force) and winding of the negative electrode plate, thereby ensuring that potentials and charges are uniformly distributed in different areas of the negative electrode plate.

In the secondary battery in accordance with the present disclosure, the negative electrode film layer usually includes the negative electrode active material, an optional binder, an optional conductive agent, and other optional additives, and is usually formed by being coated with a negative electrode slurry and dried. The negative electrode slurry is usually formed by dispersing the negative electrode active material, the optional conductive agent, the optional binder, and the like in a solvent and stirring them uniformly. The solvent may be N-methylpyrrolidone (NMP) or deionized water.

In an example, the conductive agent may include one or more of superconducting carbon, carbon black (such as Super P, acetylene black, or Ketjen black), carbon dot, carbon nanotube, graphene, and carbon nanofiber.

In an example, the binder may include one or more of styrene-butadiene rubber (SBR), water soluble unsaturated resin (SR-1B), water-borne acrylic resin, polyvinyl alcohol (PVA), sodium alginate (SA), and carboxymethyl chitosan (CMCS).

Other optional additives are, for example, thickeners (for example, sodium carboxymethyl cellulose CMC-Na), PTC thermistor materials, and the like.

After in-depth research, the inventor has also found that in a case that the negative electrode plate of the secondary battery described in this application satisfies the foregoing design conditions, if the negative electrode film layer also satisfies one or more of the following design conditions, performance of the secondary battery can be further improved.

In some embodiments, a compacted density of the negative electrode film layer may be 1.4 g/cm$^3$ to 1.65 g/cm$^3$; and optionally, the compacted density of the negative electrode film layer may be 1.45 g/cm$^3$ to 1.55 g/cm$^3$, 1.5 g/cm$^3$ to 1.55 g/cm$^3$, and the like. In a case that the negative electrode plate also satisfies that the compacted density of the negative electrode film layer is in an appropriate range, the energy density of the battery can be further improved. In addition, the particles of the negative electrode active material in the negative electrode film layer are in close contact with each other, and the negative electrode film layer has a relatively large porosity, allowing for infiltration and reflux of the liquid electrolyte, so that the negative electrode plate has relatively high active ion transmission performance, to further improve the fast charging capability of the battery.

In some embodiments, a surface density of the negative electrode film layer is less than or equal to 12.5 mg/cm$^2$; and optionally, the surface density of the negative electrode film layer is 7.8 mg/cm$^2$ to 11.0 mg/cm$^2$, 9.0 mg/cm$^2$ to 10.5 mg/cm$^2$, and the like. In a case that the negative electrode plate also satisfies that the surface density of the negative electrode film layer is in an appropriate range, the energy density of the battery can be further improved. In addition, impedance of transmitting active ions and electrons in the negative electrode film layer is relatively small, thereby further improving the fast charging capability of the battery.

In some embodiments, in the negative electrode plate, the thickness of the copper-based current collector is 4 µm to 8 µm; the compacted density of the negative electrode film layer is 1.45 g/cm$^3$ to 1.55 g/cm$^3$; and the surface density of the negative electrode film layer is 7.8 mg/cm$^2$ to 11.0 mg/cm$^2$.

In some embodiments, in the negative electrode plate, the thickness of the copper-based current collector is 4.5 µm to 6.5 µm; the compacted density of the negative electrode film layer is 1.5 g/cm$^3$ to 1.55 g/cm$^3$; and the surface density of the negative electrode film layer is 9.0 mg/cm$^2$ to 10.5 mg/cm$^2$.

In a case that the negative electrode plate satisfies the foregoing design, the negative electrode plate can obtain relatively high uniformity of lithiation during charging, thereby improving the fast charging capability and energy density of the battery. The risk of reducing and precipitating the active ions on the surface and/or part of the negative electrode film layer is relatively low, thereby further improving the cycling performance and safety performance of the battery.

The inventor(s) has also found that when the negative electrode plate of the secondary battery described in this application satisfies the foregoing design conditions, if the negative electrode active material also satisfies one or more of the following conditions, performance of the battery can be further improved.

In some embodiments, a tap density of the negative electrode active material may be 0.9 g/cm$^3$ to 1.15 g/cm$^3$; and optionally, the tap density of the negative electrode active material may be 0.9 g/cm$^3$ to 1.05 g/cm$^3$. In a case that the tap density of the negative electrode active material is in a given range, the negative electrode film layer using such negative electrode active material can obtain a relatively high compacted density, and a more unobstructed pore structure can be formed in the negative electrode film layer, to improve the active ion transmission performance, thereby further improving the energy density and fast charging performance of the battery.

In some embodiments, a volume-based median particle size D$_v$50 of the negative electrode active material may be 6 µm to 20 µm, for example, 6 µm to 14 µm or 8 µm to 12 µm. In a case that D$_v$50 of the negative electrode active material is in an appropriate range, a transmission path of active ions and electrons in a particle can be reduced, and an unobstructed pore structure can be easily formed in the negative electrode film layer, thereby further improving the fast charging capability of the battery. In addition, the liquid electrolyte has fewer side reactions on a surface of the particle, thereby further improving the cycling performance of the battery.

In some embodiments, a gram capacity of the negative electrode active material may be 345 mAh/g to 360 mAh/g, for example, 348 mAh/g to 355 mAh/g. In a case that the gram capacity of the negative electrode active material is in a given range, the negative electrode active material can have a relatively high gram capacity and a relatively short active ion migration path, which can increase a solid-state diffusion rate of active ions, thereby further improving the fast charging capability of the battery. In addition, the negative electrode active material also has relatively high structural stability, thereby further extending cycle life of the battery.

In the secondary battery in accordance with the present disclosure, the negative electrode active material may include one or more of artificial graphite and natural graphite.

In some embodiments, the negative electrode active material includes the artificial graphite.

In some embodiments, a mass percentage of the artificial graphite in the negative electrode active material is greater than or equal to 60%; and optionally, the mass percentage of the artificial graphite in the negative electrode active material may be 70% to 100%, 75% to 100%, 80% to 100%, 90% to 100%, and the like.

The artificial graphite has a small volume change when being pressed (for example, by a pressure from cold pressing or a battery cycle swelling force) and lithiated, which helps form and maintain a good pore structure at the negative electrode film layer in the thickness direction of the electrode plate, and improve infiltration performance and retention of the liquid electrolyte. Therefore, in a case that the mass percentage of the artificial graphite in negative electrode active material is in an appropriate range, the fast charging capability and cycling performance of the battery can be further improved.

In some embodiments, the negative electrode active material may further include the natural graphite. The negative electrode active material contains the natural graphite, which can further improve low-temperature performance of the battery.

In some embodiments, a mass percentage of the natural graphite in the negative electrode active material is less than or equal to 30%; for example, the mass percentage of the natural graphite in the negative electrode active material may be 5% to 30%, 10% to 30%, 10% to 25%, 10% to 20%, and the like. The negative electrode active material contains an appropriate amount of natural graphite, which can better balance low-temperature performance and high-temperature storage performance of the battery.

In the secondary battery in accordance with the present disclosure, in addition to the foregoing negative electrode active materials of this application, the negative electrode active material may optionally include a specific amount of other common negative electrode active materials, for example, one or more of soft carbon, hard carbon, silicon-based materials, tin-based materials, and lithium titanate. The silicon-based materials may be selected from one or more of elemental silicon, silicon-oxygen compounds, silicon-carbon composites, and silicon alloys. The tin-based materials may be selected from one or more of elemental tin, tin-oxygen compounds, and tin alloys.

Both the negative electrode active material and the copper-based current collector used in this application are commercially available. A person skilled in the art can make appropriate choices based on actual use environments.

In the secondary battery in accordance with the present disclosure, the negative electrode film layer may be disposed on one surface of the negative electrode current collector or on two surfaces of the negative electrode current collector. For example, the negative electrode current collector includes two opposite surfaces in its thickness direction, and the negative electrode film layer is disposed on either or both of the two opposite surfaces of the negative electrode current collector. It should be noted that all negative electrode film layer parameters provided in this application are parameter ranges of a film layer disposed on one surface. In a case that the negative electrode film layer is disposed on two surfaces of the negative electrode current collector, the negative electrode film layer is considered to fall within the protection scope of this application, as long as parameters of the film layer on any one of the surfaces satisfies this application. The ranges of $T_x$ and the compacted density and surface density of the negative electrode film layer described in this application all are parameters of a film layer compacted by cold pressing and used for assembling the battery.

In addition, in the secondary battery in accordance with the present disclosure, the negative electrode plate does not exclude other additional functional layers different from the negative electrode film layer. For example, in some embodiments, the negative electrode plate described in this application further includes a conductive primer layer (for example, formed by a conductive agent and a binder) disposed on the surface of the negative electrode current collector and sandwiched between the negative electrode current collector and the negative electrode film layer. In some other embodiments, the negative electrode plate described in this application further includes a protective layer covering the surface of the negative electrode film layer.

According to the present disclosure, $I_{Cu}$, $I_{004}$, and $I_{110}$ are peak heights of respective X-ray diffraction peaks. An X-ray diffraction pattern of the negative electrode plate may be obtained through testing according to an X-ray diffraction analysis method by using an X-ray diffractometer (such as a Bruker D8 Discover X-ray diffractometer); and then $I_{Cu}$, $I_{004}$, and $I_{110}$ of the negative electrode plate are calculated based on the X-ray diffraction pattern. The testing may be carried out with reference to the standard JISK 0131-1996. In the X-ray diffraction analysis testing, a copper target may be used as an anode target, a $CuK_\alpha$ ray is used as a radiation source, a ray wavelength λ is 1.5418 Å, a scanning 2θ angle ranges from 20° to 80°, and a scanning rate is 4° per minute. In this application, specifically, a prepared negative electrode plate is directly placed in the X-ray diffractometer, and $I_{Cu}$, $I_{004}$, and $I_{110}$ of the negative electrode plate are obtained by using the X-ray diffraction analysis method.

In the X-ray diffraction pattern of the negative electrode plate, a 2θ angle corresponding to the (111) crystal plane of the copper-based current collector is 43.4±0.3° (for example, 43.34°); a 2θ angle corresponding to the (004) crystal plane of the graphite is 54.6±0.3° (for example, 54.65°); and a 2θ angle corresponding to the (110) crystal plane of the graphite is 77.5±0.3° (for example, 77.52°).

The thickness of the copper-based current collector has a meaning well known in the art, and may be measured by using a method known in the art. For example, a micrometer (with an accuracy of ±0.1 μm) may be used for testing.

A mass percentage of Cu in the copper-based current collector has a meaning well known in the art, and may be measured by using a method known in the art. For example, an inductively coupled plasma mass spectrometer (ICP-MS, such as iCAP 7400) may be used for testing. Specifically, aqua regia is used to dissolve the copper-based current collector; the obtained solution is diluted to a specified volume; and the mass percentage of element Cu is detected and calculated by using the ICP-MS.

The surface density of the negative electrode film layer has a meaning well known in the art, and may be measured by using a method known in the art. For example, a single-sided coated and cold-pressed negative electrode plate (for a double-sided coated negative electrode plate, a negative electrode film layer on one side is wiped off first) is punched into a wafer with an area of $S_1$, and then weighed, and an obtained weight is recorded as $M_1$. Then the negative electrode film layer of the weighed negative electrode plate is wiped off, the negative electrode collector is weighed, and an obtained weight is recorded as $M_0$. Surface density of the negative electrode film layer=(weight $M_1$ of the negative electrode plate−weight $M_0$ of the negative current collector)/$S_1$.

The compacted density of the negative electrode film layer has a meaning well known in the art, and may be measured by using a method known in the art. For example, a single-sided coated and cold-pressed negative electrode plate (for a double-sided coated negative electrode plate, a negative electrode film layer on one side is wiped off first) is used, a thickness of a negative electrode film layer is measured, and a surface density of the negative electrode film layer is measured according to the foregoing method. Compacted density of the negative electrode film layer=surface density of the negative electrode film layer/thickness of the negative electrode film layer.

The tap density of the negative electrode active material has a meaning well known in the art, and may be measured by using a method known in the art. For example, the tap density may be measured with reference to GB/T 5162-2006 by using a powder tap density tester (for example, Bettersize BT-301).

$D_v50$ of the negative electrode active material has a meaning well known in the art, and may be measured by using a method known in the art. For example, $D_v50$ may be determined with reference to GB/T 19077.1-2016 by using a laser particle size analyzer (for example, Malvern Master Size 3000). $D_v50$ is a corresponding particle size when a cumulative volume distribution percentage of the negative electrode active material reaches 50%.

The gram capacity of the negative electrode active material has a meaning well known in the art, and may be measured by using a method known in the art. An example method for measuring the gram capacity of the negative electrode active material is as follows: The negative electrode active material, a conductive agent carbon black (Super P), and a binder PVDF are uniformly mixed with a solvent NMP (N-methylpyrrolidone) in a mass ratio of 91.6:1.8:6.6, to prepare a slurry. The prepared slurry is applied to a copper foil current collector and dried in an oven for later use. A lithium metal plate is used as a counter electrode, and a polyethylene (PE) film is used as a separator. Ethylene carbonate (EC), ethyl methyl carbonate (EMC), and diethyl carbonate (DEC) are mixed in a volume ratio of 1:1:1, and then $LiPF_6$ is uniformly dissolved in the foregoing solution to obtain a liquid electrolyte, where the concentration of $LiPF_6$ is 1 mol/L. A CR2430-type button battery is assembled in an argon-protected glove box. After being left standing for 12 hours, the obtained button battery is discharged to 0.005 V at a constant current of 0.05 C. After being left standing for 10 minutes, the obtained button battery is discharged to 0.005 V again at a constant current of 50 μA. After being left standing for 10 minutes, the obtained button battery is discharged to 0.005 V again at a constant current of 10 μA. The obtained button battery is then charged to 2 V at a constant current of 0.1 C, and a charge capacity is recorded. A ratio of the charge capacity to a mass of the negative electrode active material is the gram capacity of the negative electrode active material.

Positive Electrode Plate

In the secondary battery in accordance with the present disclosure, the positive electrode plate includes a positive electrode current collector and a positive electrode film layer disposed on at least one surface of the positive electrode current collector and including a positive electrode active material.

In the secondary battery in accordance with the present disclosure, the positive electrode active material may be a positive electrode active material for secondary battery well known in the art. For example, the positive electrode active material may include one or more of layered lithium transition metal oxide, lithium-containing phosphates with an olivine structure, modified compounds thereof, and the like. However, this application is not limited to such materials, and may also use other conventional well-known materials that can be used as the positive electrode active material of the secondary battery. One type of these positive electrode active materials may be used alone, or two or more types may be used in combination. An example of layered lithium transition metal oxide may include, but is not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof. An example of lithium-containing phosphates with an olivine structure may include, but is not limited to, one or more of lithium iron phosphate, composite material of lithium iron phosphate and carbon, lithium manganese phosphate, composite material of lithium manganese phosphate and carbon, lithium manganese iron phosphate, and composite material of lithium manganese iron phosphate and carbon.

In some preferred embodiments, to further improve the energy density of the battery, the positive electrode active material includes one or more of lithium nickel cobalt manganese oxide, lithium nickel cobalt aluminum oxide, and modified compounds thereof.

The foregoing modified compounds may be obtained through doping modification and/or surface coating modification on the positive electrode active material.

In the secondary battery in accordance with the present disclosure, the positive electrode film layer usually includes the positive electrode active material, an optional binder, and an optional conductive agent, and is usually formed through positive electrode slurry coating, drying, and cold pressing. The positive electrode slurry is usually formed by dispersing the positive electrode active material, the optional conductive agent, the optional binder, and the like in a solvent and stirring them uniformly. The solvent may be N-methylpyrrolidone (NMP).

In an example, the binder for positive electrode film layer may include one or more of polyvinylidene fluoride (PVDF) and polytetrafluoroethylene (PTFE).

In an example, the conductive agent for positive electrode film layer may include one or more of superconducting carbon, carbon black (such as Super P, acetylene black, or Ketjen black), carbon dot, carbon nanotube, graphene, and carbon nanofiber.

In the secondary battery in accordance with the present disclosure, the positive electrode current collector may be a metal foil or a composite current collector. For example, the positive electrode current collector may be an aluminum foil. The composite current collector may include a polymer material substrate and a metal layer formed on at least one surface of the polymer material substrate. The composite current collector may be formed by forming a metal material (such as aluminum, aluminum alloy, nickel, nickel alloy, titanium, titanium alloy, silver, and silver alloy) on the polymer material substrate (such as a substrate of polypropylene PP, polyethylene glycol terephthalate PET, polybutylene terephthalate PBT, polystyrene PS, polyethylene PE, and copolymers thereof).

Electrolyte

The secondary battery in accordance with the present disclosure has no specific limitation on a type of the electrolyte, and the electrolyte can be selected based on requirements. For example, the electrolyte may be selected from at least one of solid electrolyte and liquid electrolyte (namely, an electrolyte solution).

In some embodiments, the electrolyte is the electrolyte solution. The electrolyte solution includes an electrolytic salt and a solvent.

In some embodiments, the electrolytic salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bis(fluorosulfonyl)imide), LiTFSI (lithium bis(trifluoromethanesulphonyl)imide), LiTFS (lithium trifluoromethanesulfonate), LiDFOB (lithium difluoro(oxalato)borate), LiBOB (lithium bis(oxalate)borate), $LiPO_2F_2$ (lithium difluorophosphate), LiDFOP (Lithium bis [ethanedioato(2-)-κO1, κO2]difluorophosphate(1-)), and LiTFOP (lithium tetrafluoro(oxalato)phosphate).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylene sulfone (SF), methylsulfonylmethane (MSM), ethyl methyl sulfone (EMS), and diethyl sulfone (ESE).

In some embodiments, the liquid electrolyte may further optionally include an additive. For example, the additive may include a negative electrode film-forming additive, or may include a positive electrode film-forming additive, or may include an additive capable of improving some performance of a battery, for example, an additive for improving over-charge performance of the battery, an additive for improving high-temperature performance of the battery, or an additive for improving low-temperature performance of the battery.

Separator

A secondary battery using a liquid electrolyte and some secondary batteries using a solid electrolyte further include a separator. The separator is disposed between a positive electrode plate and a negative electrode plate, and plays a role of isolation. This application has no specific limitation on a type of the separator, and any well-known porous separator with good chemical stability and mechanical stability can be selected. In some embodiments, the separator may be selected from one or more of glass fiber film, non-woven fabric film, polyethylene film, polypropylene film, polyvinylidene fluoride film, and a combination of two or more than two of the foregoing composite films.

This application has no specific limitation on a shape of the secondary battery, and the secondary battery may be cylindrical, rectangular, or of any other shape. FIG. 1 shows a rectangular secondary battery 5 as an example.

In some embodiments, the secondary battery may include an outer package. The outer package is used for packaging a positive electrode plate, a negative electrode plate, and an electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic, for example, one or more of polypropylene (PP), polybutylene terephthalate (PBT), polybutylene succinate (PBS), and the like.

Figure 2:
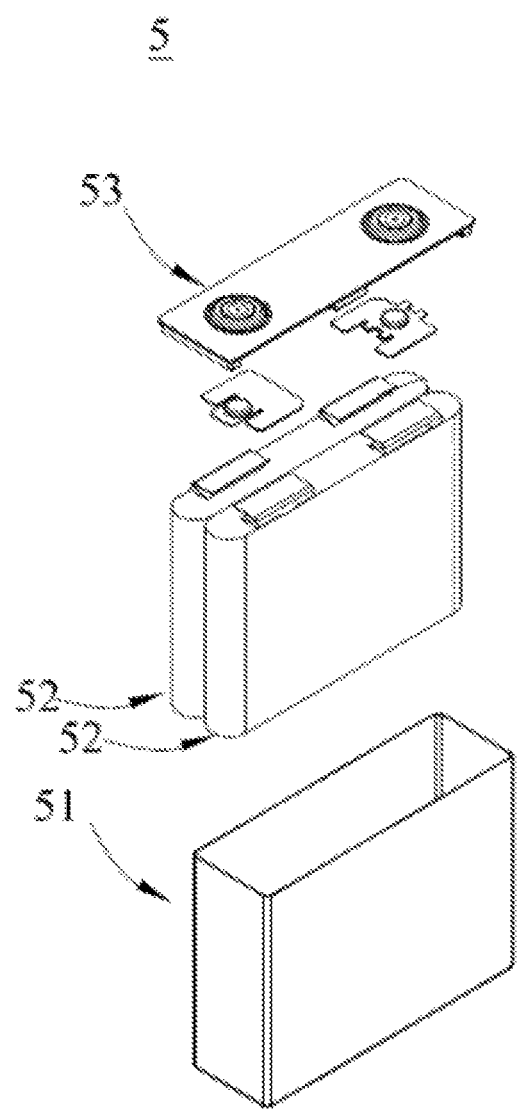
FIG. 2 is an exploded view of FIG. 1.

In some embodiments, referring to FIG. 2, the outer package may include a housing 51 and a cover plate 53. The housing 51 may include a base plate and side plates connected to the base plate, and the base plate and the side plates enclose an accommodating cavity. The housing 51 has an opening communicating with the accommodating cavity, and the cover plate 53 can cover the opening to close the accommodating cavity. A positive electrode plate, a negative electrode plate, and a separator may be made into an electrode assembly 52 through winding or lamination. The electrode assembly 52 is packaged in the accommodating cavity. The liquid electrolyte infiltrates the electrode assembly 52. There may be one or more electrode assemblies 52 in the secondary battery 5, and the quantity may be adjusted as required.

In some embodiments, secondary batteries may be assembled into a battery module. The battery module may include a plurality of secondary batteries, and a specific quantity of the secondary batteries may be adjusted based on application and capacity of the battery module.

Figure 3:
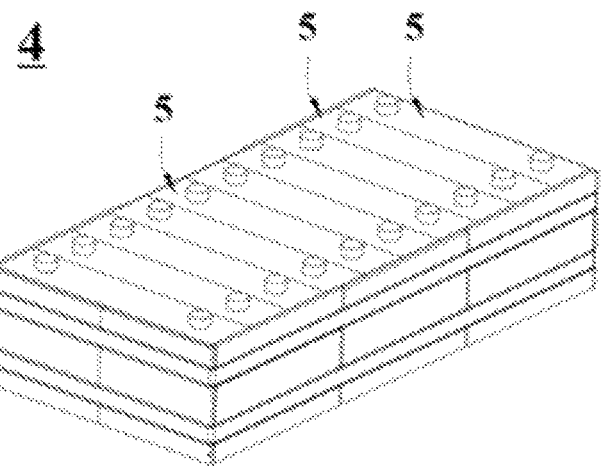
FIG. 3 is a schematic diagram of an embodiment of a battery module.

FIG. 3 shows a battery module 4 as an example. Referring to FIG. 3, in the battery module 4, a plurality of secondary batteries 5 may be sequentially arranged in a length direction of the battery module 4. Certainly, the secondary batteries may alternatively be arranged in any other manner. Further, the plurality of secondary batteries 5 may be fastened by using fasteners.

Optionally, the battery module 4 may further include a housing with an accommodating space, and the plurality of secondary batteries 5 are accommodated in the accommodating space.

In some embodiments, the battery modules may be further assembled into a battery pack, and a quantity of battery modules included in the battery pack may be adjusted based on application and capacity of the battery pack.

Figure 4:
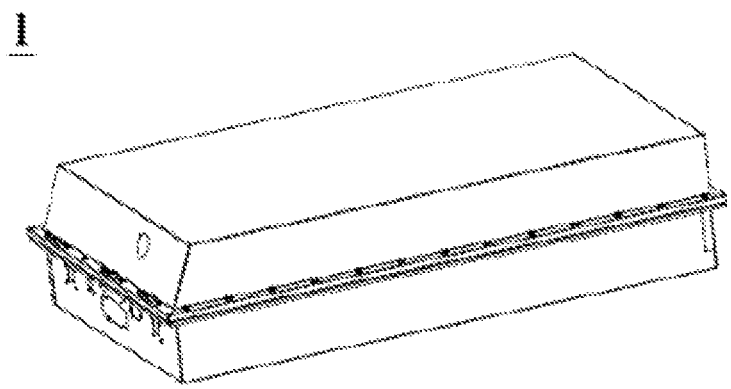
FIG. 4 is a schematic diagram of an embodiment of a battery pack.
Figure 5:
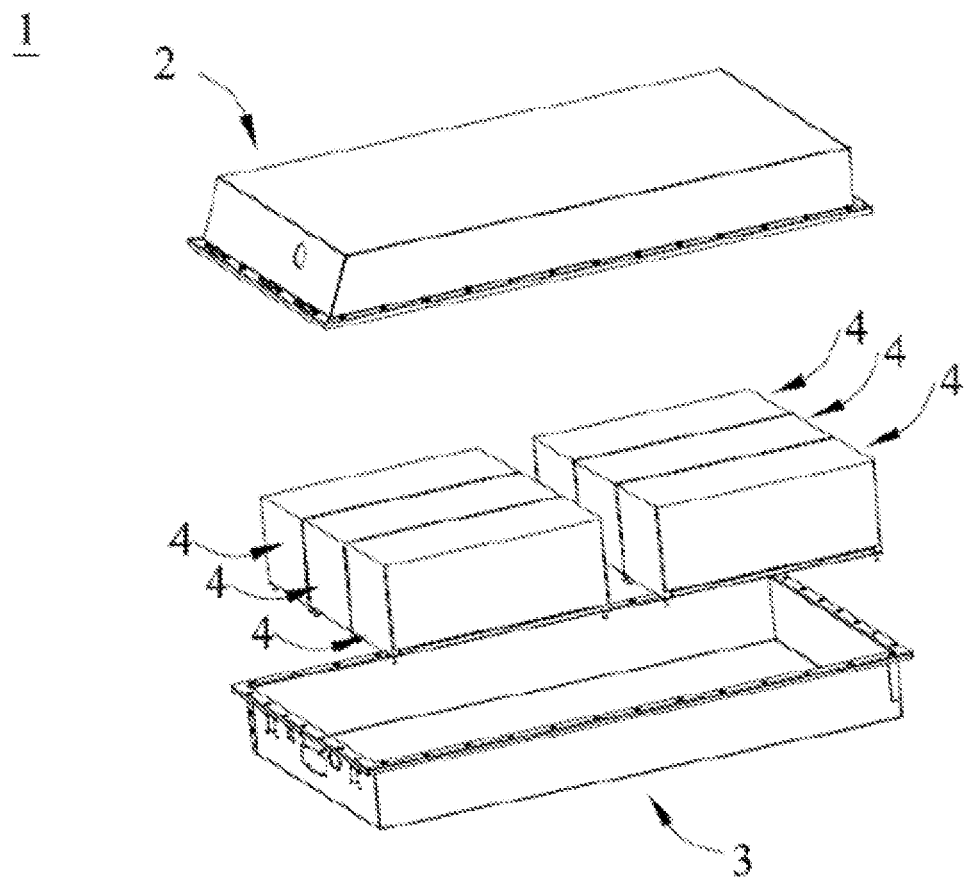
FIG. 5 is an exploded view of FIG. 4.

FIG. 4 and FIG. 5 show a battery pack 1 as an example. Referring to FIG. 4 and FIG. 5, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

An Example Preparation Method

A structure and preparation method of the secondary battery in accordance with the present disclosure are known.

In an example, the preparation method of the secondary battery may include a step of assembling a negative electrode plate, a positive electrode plate, a separator, and a liquid electrolyte to form the secondary battery. The positive electrode plate, the separator, and the negative electrode plate are wound or laminated in sequence to obtain an electrode assembly. The electrode assembly is placed in an outer package, the liquid electrolyte is injected, and the outer package is sealed, to obtain the secondary battery.

An example preparation method of the positive electrode plate is as follows: A positive electrode active material, an optional conductive agent, and an optional binder is dissolved in a solvent (for example, N-methylpyrrolidone, NMP for short) to form a uniform positive electrode slurry. The positive electrode slurry is applied to a positive electrode current collector, and processes such as drying and cold pressing are performed to obtain the positive electrode plate.

An example preparation method of the negative electrode plate is as follows: A negative electrode active material, an optional conductive agent, an optional binder, and an optional thickener are dissolved in a solvent (for example, deionized water) to form a uniform negative electrode slurry. The negative electrode slurry is applied to a copper-based current collector, and processes such as drying and cold pressing are performed to obtain the negative electrode plate.

Apparatus

An embodiment provides an apparatus, and the apparatus includes the secondary battery in the first aspect of this application. The secondary battery may be used as a power supply of the apparatus, or may be used as an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery, a battery module, or a battery pack may be selected for the apparatus according to requirements for using the apparatus.

Figure 6:
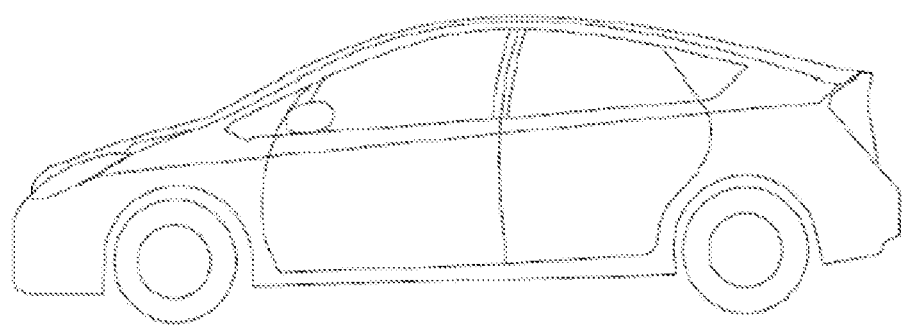
FIG. 6 is a schematic diagram of an embodiment of an apparatus using a secondary battery as a power source.

FIG. 6 shows an apparatus as an example. The apparatus is a battery electric vehicle, a hybrid electric vehicle, a plug-in hybrid electric vehicle, or the like. To meet requirements of the apparatus for high power and high energy density of the secondary battery, a battery pack or a battery module may be used.

In another example, the apparatus may be a mobile phone, a tablet computer, a notebook computer, or the like. The apparatus is usually required to be light and thin, and the secondary battery may be used as a power supply.

EXAMPLES

Examples below more specifically describe the content disclosed in this application, and these embodiments are merely used for explanatory description. It is apparent for a person skilled in the art to make various modifications and variations within the scope of the content disclosed in this application. Unless otherwise stated, all parts, percentages, and ratios reported in the following examples are based on weight, all reagents used in the examples are commercially available or synthesized in a conventional manner, and can be used directly without further treatment. All instruments used in the examples are commercially available.

1. Preparation of Negative Electrode Active Material

The negative electrode active material in the examples of this application is commercially available or may be prepared by using the following method.

1. Artificial graphite A may be prepared by using the following method: A petroleum green coke with a volatile content of 3% to 8% was crushed to obtain a petroleum green coke raw material with a volume-based median particle size $D_v50$ of 6 μm to 12 μm. The petroleum green coke raw material was shaped and classified to obtain a precursor. The precursor was graphitized at a temperature of 2800° C. to 3200° C., and then was coated with pitch and carbonized to obtain the artificial graphite A. The volume-based median particle size $D_v50$ of the artificial graphite A was controlled at 8 μm to 12 μm, a tap density was controlled at 0.9 g/cm³ to 1.05 g/cm³, and a gram capacity was controlled at 345 mAh/g to 355 mAh/g.

2. Artificial graphite B may be prepared by using the following method: A petroleum green coke with a volatile content of 5% to 9% was first calcined to obtain a calcined petroleum coke, and then was crushed to obtain a petroleum green coke raw material with a volume-based median particle size $D_v50$ of 12 μm to 20 μm. The petroleum green coke raw material was shaped and classified to obtain a precursor. The precursor was graphitized at a temperature of 2800° C. to 3200° C. to obtain the artificial graphite B. The volume-based median particle size $D_v50$ of the artificial graphite B was controlled at 12 μm to 20 μm, a tap density was controlled at 0.95 g/cm³ to 1.15 g/cm³, and a gram capacity is controlled at 350 mAh/g to 360 mAh/g.

3. Natural graphite was the GF1-S2 natural graphite purchased from Shanghai Shanshan Technology Co., Ltd.

2. Preparation of Battery

Example 1

Preparation of Negative Electrode Plate

The negative electrode active material artificial graphite A, a conductive agent carbon black (Super-P), a binder SBR, and a thickener CMC-Na were fully stirred and mixed in an appropriate amount of deionized water in a weight ratio of 95.5:1.6:1.5:1.4, to form a uniformed negative electrode slurry. The negative electrode slurry was applied to two surfaces of a copper foil current collector, followed by drying, cold pressing, slitting, and cutting, to obtain the negative electrode plate. A thickness of the copper foil current collector was 6 μm, and a mass percentage of copper was 99.9%. A compacted density of a negative electrode film layer is 1.5 g/cm³, and a surface density was 9.4 mg/cm².

Preparation of Positive Electrode Plate

The positive electrode active material lithium nickel cobalt manganese oxide $LiNi_{0.5}Co_{0.2}Mn_{0.3}O_2$ (NCM523), a conductive agent carbon black (Super P), and a binder PVDF were fully stirred and mixed in an appropriate amount of deionized water in a weight ratio of 97.5:1.4:1.1, to form a uniformed positive electrode slurry. The positive electrode slurry was applied to a surface of a copper foil of a positive electrode current collector, followed by drying and cold pressing, to obtain the positive electrode plate. A surface density of a positive electrode film layer was 15.8 mg/cm², and a compacted density was 3.4 g/cm³.

Preparation of Liquid Electrolyte

Ethylene carbonate (EC), dimethyl carbonate (DMC), and diethyl carbonate (DEC) were mixed in a volume ratio of 1:1:1, and then $LiPF_6$ was uniformly dissolved in the foregoing solution to obtain a liquid electrolyte, where concentration of $LiPF_6$ was 1 mol/L.

Separator

A PE film was used.

Preparation of Secondary Battery

A positive electrode plate, a separator, and a negative electrode plate were stacked in sequence, and a reference electrode (where the reference electrode was used for a subsequent performance test of a battery sample and may be selected from a lithium plate, a lithium metal wire, and the like; and the reference electrode should be separated by the separator to prevent from coming into contact with any side of positive and negative electrodes) was added between the separator and the negative electrode plate, followed by winding, to obtain an electrode assembly. The electrode assembly was placed into an outer package, the liquid electrolyte was added, and processes such as packaging, standing, formation, and aging were performed to obtain a lithium-ion secondary battery.

Preparation methods of Examples 2 to 15 and Comparative Examples 1 and 2 are similar to that of Example 1, but compositions and product parameters of the negative electrode plate and the positive electrode plate are adjusted. For details of different product parameters, refer to Table 1.

2. Battery Performance Test (1) Fast Charging Capability Test of Battery

At 25° C., a three-electrode secondary battery prepared in the examples and the comparative examples was charged at a constant current of 0.33 C (that is, a current value at which a theoretical capacity was completely discharged within 1 hour) to a charge cut-off voltage 4.2 V, and then charged at a constant voltage to a current of 0.05 C, left standing for 5 minutes, and then discharged at a constant current of 0.33 C to a discharge cut-off voltage $V_2$, and an actual capacity of the battery was recorded as $C_0$.

Then the battery was charged at constant currents of 0.5 $C_0$, 1 $C_0$, 1.5 $C_0$, 2 $C_0$, 2.5 $C_0$, 3 $C_0$, 3.5 $C_0$, 4 $C_0$, and 4.5 $C_0$ in turn to a full battery charge cut-off voltage of 4.2 V or a 0 V negative electrode cut-off voltage (the voltage reached first prevails), and discharged at 1 $C_0$ to a full battery discharge cut-off voltage of 2.8 V after each charge. Corresponding negative electrode potentials when the battery was charged to 10% SOC, 20% SOC, 30% SOC, . . . , and 80% SOC at different charging rates were recorded. Rate-negative electrode potential curves in different SOCs were drawn, and corresponding charging rates when the negative electrode potential was 0 V in different SOCs were obtained through linear fitting. The charging rate was a charging window in the SOC, and charging windows in 20% SOC, 30% SOC, . . . , and 80% SOC were respectively recorded as $C_{20\%\ SOC}$, $C_{30\%\ SOC}$, $C_{40\%\ SOC}$, $C_{50\%\ SOC}$, $C_{60\%\ SOC}$, $C_{70\%\ SOC}$, and $C_{80\%\ SOC}$. A charge time T (min) of the battery charged form 10% SOC to 80% SOC was calculated according to the formula $(60/C_{20\%\ SOC}+60/C_{30\%\ SOC}+60/C_{40\%\ SOC}+60/C_{50\%\ SOC}+60/C_{60\%\ SOC}+60/C_{70\%\ SOC}+60/C_{80\%\ SOC})\times 10\%$. A shorter time indicates a better fast charging capability of the battery.

(2) Cycle Performance Test of Battery

At 25° C., a secondary battery prepared in the examples and the comparative examples was charged at a constant current of 0.33 C to a charge cut-off voltage of 4.2 V, and then charged at a constant voltage to a current of 0.05 C, left standing for 5 minutes, and then discharged at a constant current of 0.33 C to a discharge cut-off voltage of 2.8 V, and a discharge capacity $C_b$ of the battery in the first cycle was recorded. Then, a charge-discharge cycle was carried out according to the foregoing processes, and a discharge capacity $C_e$ of each cycle was recorded until a cycling capacity retention rate ($C_e/C_b \times 100\%$) was 80%, and a quantity of cycles was recorded.

Test results of Examples 1 to 15 and Comparative Examples 1 and 2 are shown in Table 1.

TABLE 1

| Number | Positive electrode film layer Surface density (mg/cm²) | Negative electrode film layer | | | Copper-based current collector Thickness (μm) | Negative electrode plate $T_x$ | Secondary battery | |
|---|---|---|---|---|---|---|---|---|
| | | Negative electrode active material | Compacted density (g/cm³) | Surface density (mg/cm²) | | | Charge time T (min) | Quantity of cycles |
| Example 1 | 15.8 | Artificial graphite A | 1.5 | 9.4 | 6 | 47.4 | 8.7 | 2900 |
| Example 2 | 15.8 | Artificial graphite A | 1.55 | 9.4 | 6 | 47.2 | 8.9 | 2800 |
| Example 3 | 15.8 | Artificial graphite A | 1.6 | 9.4 | 6 | 46.8 | 9.3 | 2700 |
| Example 4 | 15.8 | Artificial graphite A | 1.65 | 9.4 | 6 | 46.4 | 9.7 | 2600 |
| Example 5 | 15.3 | Artificial graphite A | 1.55 | 9.1 | 6 | 55.7 | 8.6 | 2850 |
| Example 6 | 16.3 | Artificial graphite A | 1.55 | 9.7 | 6 | 43.6 | 9.5 | 2750 |
| Example 7 | 16.9 | Artificial graphite A | 1.55 | 10.0 | 6 | 40.3 | 9.9 | 2700 |
| Example 8 | 17.4 | Artificial graphite A | 1.55 | 10.4 | 6 | 37.9 | 12.1 | 2650 |
| Example 9 | 18.0 | Artificial graphite A | 1.55 | 10.7 | 6 | 35.6 | 14.7 | 2600 |
| Example 10 | 18.5 | Artificial graphite A | 1.55 | 11.0 | 6 | 33.0 | 17.3 | 2550 |
| Example 11 | 19.1 | Artificial graphite A | 1.55 | 11.3 | 6 | 29.8 | 19.7 | 2520 |
| Example 12 | 15.8 | Artificial graphite A | 1.55 | 9.4 | 8 | 58.2 | 8.3 | 2870 |
| Example 13 | 15.8 | Artificial graphite A | 1.55 | 9.4 | 4.5 | 39.7 | 10.7 | 2670 |
| Example 14 | 15.8 | 80% artificial graphite A + 20% natural graphite | 1.55 | 9.4 | 6 | 46.9 | 9.2 | 2720 |
| Example 15 | 14.6 | Artificial graphite B | 1.45 | 8.4 | 6 | 36.7 | 13.5 | 2438 |
| Comparative Example 1 | 20.7 | Artificial graphite A | 1.75 | 12.6 | 6 | 23.7 | 25.5 | 2400 |
| Comparative Example 2 | 19.1 | Artificial graphite B | 1.55 | 11.3 | 6 | 23.4 | 28.4 | 2300 |

According to Table 1, in the secondary battery in accordance with the present disclosure, the negative electrode plate is controlled to satisfy a specific relationship $T_x$ between the diffraction peak intensity of the (111) crystal plane of Cu, the diffraction peak intensity of the (004) crystal plane of the graphite, and the diffraction peak intensity of the (110) crystal plane of the graphite, so that the secondary battery can have both good fast charging capability and good cycling performance.

Particularly, in the case of $40 \leq T_x \leq 50$, the battery can have good fast charging capability, good cycling performance, and high energy density at the same time.

Comparative Example 1 and Comparative Example 2 cannot meet a range of $T_x$ in this application, and therefore lithiation performance of the negative electrode film layer is relatively poor, resulting in adverse effects on both the fast charging capability and cycle life of the battery.

The foregoing descriptions are merely some embodiments, and are not intended to limit the protection scope of the present disclosure. Any equivalent modifications or replacements readily figured out by a person skilled in the art within the technical scope disclosed in this application shall fall within the protection scope of the present disclosure.

What is claimed is:

1. A secondary battery, comprising a negative electrode plate, wherein the negative electrode plate comprises a copper-based current collector and a negative electrode film layer disposed on at least one surface of the copper-based current collector, the negative electrode film layer comprising a negative electrode active material and the negative electrode active material comprising graphite, wherein the negative electrode plate satisfies $T_x \geq 25$, and $$T_x = \sqrt{I_{Cu}^2/(I_{004} \times I_{110})}, \text{ wherein}$$

$I_{Cu}$ represents a diffraction peak intensity of a (111) crystal plane of the copper-based current collector of the negative electrode plate in an X-ray diffraction pattern;

$I_{110}$ represents a diffraction peak intensity of a (110) crystal plane of the graphite of the negative electrode plate in the X-ray diffraction pattern; and $I_{004}$ represents a diffraction peak intensity of a (004) crystal plane of the graphite of the negative electrode plate in the X-ray diffraction pattern.

2. The secondary battery according to claim 1, wherein the negative electrode plate satisfies $29 \leq T_x \leq 70$.

3. The secondary battery according to claim 1, wherein the negative electrode plate satisfies $35 \leq T_x \leq 60$.

4. The secondary battery according to claim 1, wherein the negative electrode plate satisfies $40 \leq T_x \leq 50$.

5. The secondary battery according to claim 1, wherein thickness of the copper-based current collector is less than or equal to 8 μm, and the thickness of the copper-based current collector is 4 μm to 6.5 μm.

6. The secondary battery according to claim 1, wherein a mass percentage of Cu in the copper-based current collector is greater than or equal to 99%, and the mass percentage of Cu in the copper-based current collector is 99.5% to 100%.

7. The secondary battery according to claim 1, wherein the negative electrode active material satisfies one or more of the following conditions:
   (1) a tap density of the negative electrode active material is 0.9 g/cm³ to 1.15 g/cm³, and the tap density of the negative electrode active material is 0.9 g/cm³ to 1.05 g/cm³;
   (2) a volume-based median particle size $D_v50$ of the negative electrode active material is 6 μm to 14 μm, and the volume-based median particle size $D_v50$ of the negative electrode active material is 8 μm to 12 μm; and
   (3) a gram capacity of the negative electrode active material is 345 mAh/g to 360 mAh/g, and the gram capacity of the negative electrode active material is 348 mAh/g to 355 mAh/g.

8. The secondary battery according to claim 1, wherein the negative electrode active material comprises artificial graphite; and optionally, a mass percentage of the artificial graphite in the negative electrode active material is greater than or equal to 60%; and optionally, the mass percentage of the artificial graphite in the negative electrode active material is 80% to 100%.

9. The secondary battery according to claim 1, wherein the negative electrode film layer satisfies one or more of the following conditions (1) and (2):
   (1) a compacted density of the negative electrode film layer is 1.4 g/cm³ to 1.65 g/cm³; and optionally, the compacted density of the negative electrode film layer is 1.45 g/cm³ to 1.55 g/cm³; and
   (2) a surface density of the negative electrode film layer is less than or equal to 12.5 mg/cm²; and optionally, the surface density of the negative electrode film layer is 9.0 mg/cm² to 10.5 mg/cm².

10. An apparatus, comprising the secondary battery of claim 1.

* * * * *